Patented Aug. 19, 1941

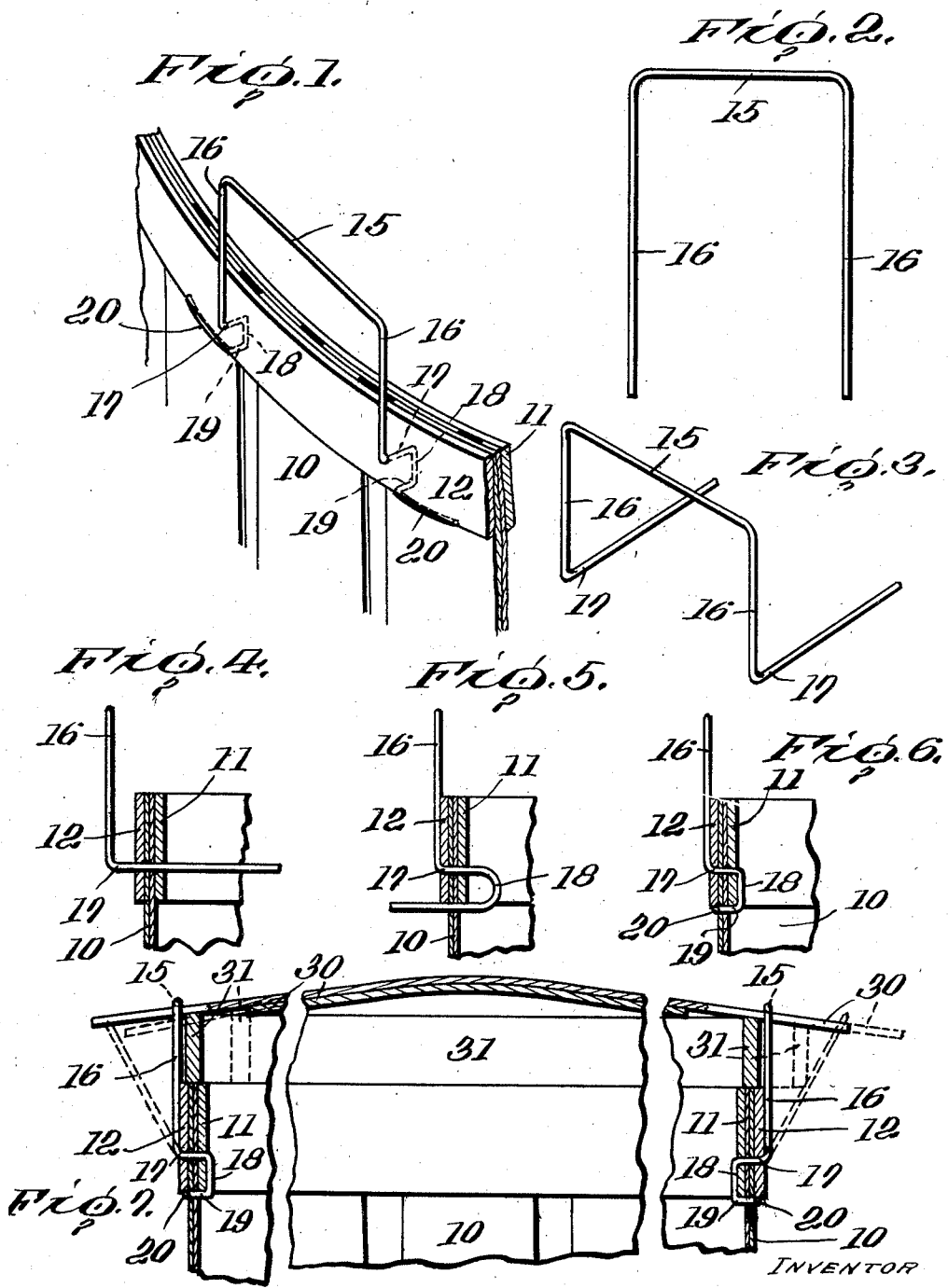

2,252,930

UNITED STATES PATENT OFFICE 2,252,930

HANDLE FOR BASKETS AND LIKE RECEPTACLES

Paul Hintz, Marshall, Tex.

Application March 18, 1939, Serial No. 262,703

2 Claims. (Cl. 217—125)

This invention relates to a handle and to a method of forming and assembling the same upon a basket or like receptacle.

It is now customary in the manufacture of receptacles, such as the continuous stave and export tub types of baskets which are made of wood veneer with embracing hoops, to provide handles of wire, these handles being formed of a U-shaped piece of wire which has its legs passed through the side wall of the basket, and the inwardly extending ends are then bent over to prevent withdrawal of the handle under the conditions of service. In some instances, the inwardly projecting ends were short and were merely bent or clinched at an angle. During the application of the cover to the basket, it is customary to engage one projecting end of the handle slat of the cover within the bight of one handle, and then to push against the cover while pulling on the bight or stirrup of the other handle, until this other handle could be slipped over the cover slat and then pushed back to its original position; in the finished package, the handles thus embraced the projecting ends of the long slat on the cover and served to hold the cover on the basket. The removal of the cover was accomplished by a reverse operation. The springing of the handle, incident to these movements, often caused the inwardly extending ends of the handles to be displaced, so that they would gouge into the fruit or other merchandise in the basket. It has heretofore been proposed to avoid this difficulty in various ways.

According to the present invention, this difficulty is avoided by bringing the ends of the U-shaped member outwardly through the side-wall of the basket at a point below the hoops and then clinching these ends on the outside of the basket preferably in such a location that they cannot be accidentally engaged.

As it is necessary to make these baskets cheaply, the handles must be capable of being formed and assembled by simple machine operations; and the finished handle should not be able to turn or rock when the aforesaid movements are being produced for engagement with the cover slat.

An illustrative form of practicing the present invention is shown in the accompanying drawing, in which:

Figure 1 is a perspective view of a part of the upper end of a basket, showing the completed handle in position thereon.

Figure 2 is a view showing the first operation of forming the handle.

Figure 3 shows the handle at the completion of the second operation.

Figure 4 shows the handle after its legs have been passed into the basket.

Figure 5 shows the handle after the inwardly projecting legs have been bent around and forced back through the side wall.

Figure 6 is a view corresponding to Figures 4 and 5, and showing the completed and clinched handle.

Figure 7 is a view corresponding to Figure 6, but illustrating the springing of the handle incident to its engagement with a cover slat.

In this drawing, the invention is illustratively shown in one embodiment and as applied to a basket of the customary bushel type, which may either be made of continuous staves, or with short side panels and a separate bottom member. In this customary basket, there are provided both inner and outer top hoops, which usually are made of veneer material of the same width and thickness. This basket is illustrated as having the side wall 10 formed of veneer staves, the inner top hoop 11 and the outer top hoop 12.

As with the usual stapling machine, a long length of wire is successively fed and cut off and bent to form a U-shaped member having the bar 15 and the legs 16 (Figure 2). In a second operation, the two legs are bent to provide the bight or stirrup proper 15, 16, with the angular-directed portions 17, (Figure 3). The third operation, Figure 4, in the making and assembling of the handle on a basket, is to pass the ends 17 through the side wall of the basket at the upper end thereof, so that the ends are forced through the outer top hoop, the upper portions of the staves which are received between the two top hoops, and through the inner top hoop, so that the ends project into the interior of the basket. As a fourth operation, Figure 5, the inturned ends 17 are bent downwardly and outwardly and forced through the side wall, at a point immediately below the lower edges of the top hoops; and the curvature inside the basket is then flattened to form the downwardly extending portion 18. The fifth operation, Figure 6, comprises bending the outwardly projecting portions 19, so that the extreme ends 20 are located in the angle formed by the lower edge of the outer top hoop and the outer surface of the side wall. It is preferred to form these ends 20 on a curve corresponding to the curvature of the side wall, or even of slightly less radius, so that they are thereby protected against accidental engagement. In cases where the lower edge of the outer top hoop extends or is spaced away from the side wall staves, the extreme ends are similarly protected by their juxtaposition to the hoop. In each case it is preferred to have the outwardly extending portions 19 engage closely beneath the inner top hoop 11, and the portions 20 closely beneath the outer top hoop 12.

It is preferred to pass the angularly directed portion 17, Figure 4, through the hoop at a point below its mid-height, with hoops of the width customarily used, in order to have the length of the stirrup legs 16 as great as possible, whereby to enable the handle to be engaged with the cover slat by rocking through a relatively small angle.

It will be understood that the normal procedure is to assemble and apply two such handles to each basket, these handles being located diametrically opposite one another.

The operation of assembling the basket with its cover can then be effected as shown in Figure 7. The cover is illustrated as comprising the cover slat 30, and the cover hoop 31. One end of the handle slat 30 of the cover is usually engaged beneath one handle (that at the right in Figure 7, for example), and the cover is then pushed toward the right (dotted lines, Figure 7), resulting in an outward movement of the handle bight or stirrup 15, 16 at the right-hand side of the figure. The left-hand handle 15, 16 is simultaneously pulled toward the left, until it can be engaged over the left-hand end of the cover slat 30; and then is pushed back to its original (full line) position, and the right-hand handle 15, 16 is likewise restored with a seating of the hoop 31 on top of the basket body hoops 11, 12. It will be noted that the movement of a handle 15, 16 from the full line position to the dotted line position, and back again, cannot produce a shifting or rocking of the parts of the handle structure which are located in or tightly in contact with the side wall, but that the same remain essentially in their original positions.

It is preferred to have the diameter of the wire, which is employed for the handle, slightly less than the thickness of the outer top hoop, so that this hoop furnishes abundant protection against accidental engagement of the extreme ends of the handle structure with the hand or clothing, or with another basket.

The handle, completed and assembled upon the basket, provides a rugged structure which does not injure the contents of the basket during its manipulation, and which does not pull off under the conditions of service.

It is obvious that the invention is not limited solely to the particular illustrative form shown or to employment with the particular receptacle shown, but that it can be employed in many ways within the scope of the appended claims.

I claim:

1. A handle for a basket of side wall and top hoop construction, comprising an integral structure of wire including a bight for receiving the hand or cover slat and having downwardly extending legs located outside the basket, inwardly turned parts which pass through the top hoop and into the interior of the basket, downwardly turned parts inside the basket, outwardly turned parts which pass through the side wall and emerge at the outside immediately below the outer top hoop, and peripherally directed end parts located below and substantially in contact with the lower edge of the outer top hoop and having the extreme ends located inside of the outer diameter of the outer top hoop whereby said extreme ends are substantially protected against accidental engagement, said inwardly, downwardly and outwardly turned parts being held substantially immovable relative to the side wall by said peripherally directed parts while said legs are moved during the operations of engaging and disengaging said bight with the cover slat.

2. A handle for a basket having side walls with inner and outer top hoops, comprising a structure of wire having a diameter less than the thickness of the outer top hoop and including a bight for receiving the handle or cover slat and having downwardly extended legs located outside the basket and extending below the mid-height of the outer top hoop, inwardly turned parts which pass through the outer top hoop below its mid-height and through the side wall and inner hoop into the interior of the basket, said downwardly extending legs being free to move upon bending adjacent their junctions with the inwardly turned parts, downwardly turned parts inside the basket in close engagement with the inner face of the inside top hoop, outwardly turned parts which pass through the side wall immediately below the top hoops and emerge at the outside immediately below the outer top hoop, and peripherally directed end parts positioned closely beneath and in contact with the lower edge of the outer top hoop and having the extreme ends located within the angle formed by the lower edge of the outer top hoop and the outer surface of the side wall, said inwardly, downwardly and outwardly turned parts being held substantially immovable relative to the side wall by said peripherally directed parts while said legs are moved during the operations of engaging and disengaging said bight with the cover slat.

PAUL HINTZ.